Figure 1:
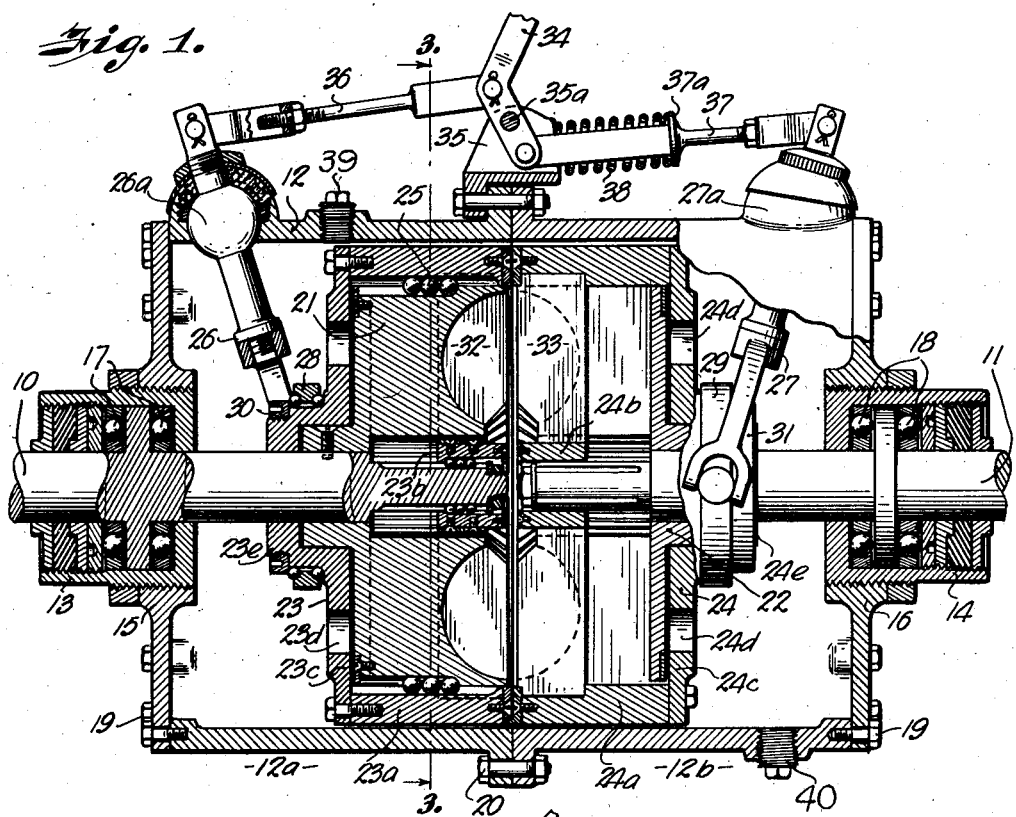

Dec. 25, 1945. J. F. GREGG 2,391,413
HYDRAULIC COUPLING
Filed June 19, 1942 2 Sheets-Sheet 1

INVENTOR.
James F. Gregg
BY Thos. E. Scofield
ATTORNEY.

Dec. 25, 1945.  J. F. GREGG  2,391,413
HYDRAULIC COUPLING
Filed June 19, 1942  2 Sheets-Sheet 2

INVENTOR.
James F. Gregg
BY
ATTORNEY.

Patented Dec. 25, 1945

2,391,413

UNITED STATES PATENT OFFICE 2,391,413

HYDRAULIC COUPLING

James F. Gregg, Laramie, Wyo.

Application June 19, 1942, Serial No. 447,683

4 Claims. (Cl. 60—54)

My invention relates to new and useful improvements in hydraulic couplings and relates more particularly to a clutch mechanism for hydraulic couplings.

Couplings of this type comprise an impeller mounted on a drive shaft and a runner mounted on a driven shaft enclosed within a housing containing hydraulic fluid such as oil or glycerine. The impeller and runner are provided with oppositely positioned radial vanes. When the impeller is rotated, its vanes cause the fluid in the housing to rotate. Power is transmitted to the runner and driven shaft by the kinetic energy of the rotating vortex of liquid circulating between the impeller and runner. The circulating liquid acts against the vanes of the runner and causes it to rotate in a sympathetic manner. Under normal load conditions, the difference in speed between the impeller and runner is less than one per cent.

Obviously, it is an advantage to be able to rotate the impeller without also imparting motion to the runner. I propose to accomplish this result by providing separate neutralizing disks for the impeller and runner. One face of each neutralizing disk has blanking sectors that fit into the spaces between the vanes. The impeller and runner vanes may be simultaneously retracted into interstices or slots between the sectors thus gradually reducing their effective areas and finally covering them altogether. When both impeller and runner vanes are blanked in this manner, there can be no creeping of the runner since no effective movement is given to the hydraulic fluid. In the past, the runner has on occasions been rendered ineffective by blanking or neutralizing the runner vanes. However, when only the runner vanes are blanked, the impeller still generates a vortex of active liquid which tends to give movement to the runner and a slight rotative movement or creep to the runner and driven shaft.

It is recognized that attempts have been made to render ineffectual the vanes of runner disks or rotors in hydraulic couplings or power transmitters by advancing blanking sectors into the spaces between the vanes or withdrawing the vanes through a flat surfaced disk slotted to permit recession or advancement of the vanes. This practice is exemplified by Patents 2,258,302 issued to Adolph Ronning October 7, 1941; 1,125,593 issued to Thomas D. W. Pinckney January 19, 1915; and 2,270,545 issued to Carl A. Neracher and William T. Dunn January 20, 1942.

Nowhere in the art however has it been appreciated that creepage can be avoided by blanking both the impeller and the runner.

An important object of my invention therefore is the provision of a hydraulic coupling wherein the impeller may be easily rendered ineffectual to rotate the runner.

Another object of my invention is the provision of a hydraulic coupling wherein the impeller and runner may be easily made to rotate with varying degrees of slippage so that the runner can be made to rotate slowly when the impeller is rotating at high speed or so that the runner can be made to rotate substantially synchronously with the impeller.

A further advantage and differentiation from the art that has preceded is the fact that the power transmitted to the runner vanes by the rotating liquid vortex is not transferred from the vanes of the runner to its hub and thence to the driven shaft but instead is transmitted from the vanes of the runner to its rim, thence to the neutralizing disk and finally to the driven shaft upon which the disk is fixedly mounted.

Furthermore by providing antifrictional elements between the rims of the impeller and runner and their related neutralizing disks there has been reduced to a minimum the effort required to shift the impeller and runner from a power transmitting position to a neutral position or vice versa. These antifrictional elements also facilitate the transmission of energy from the drive shaft to the driven shaft through the impeller and runner and their neutralizing disks in an economical and efficient manner.

Other objects and advantages of my invention will be apparent during the course of the following description.

Figure 2:
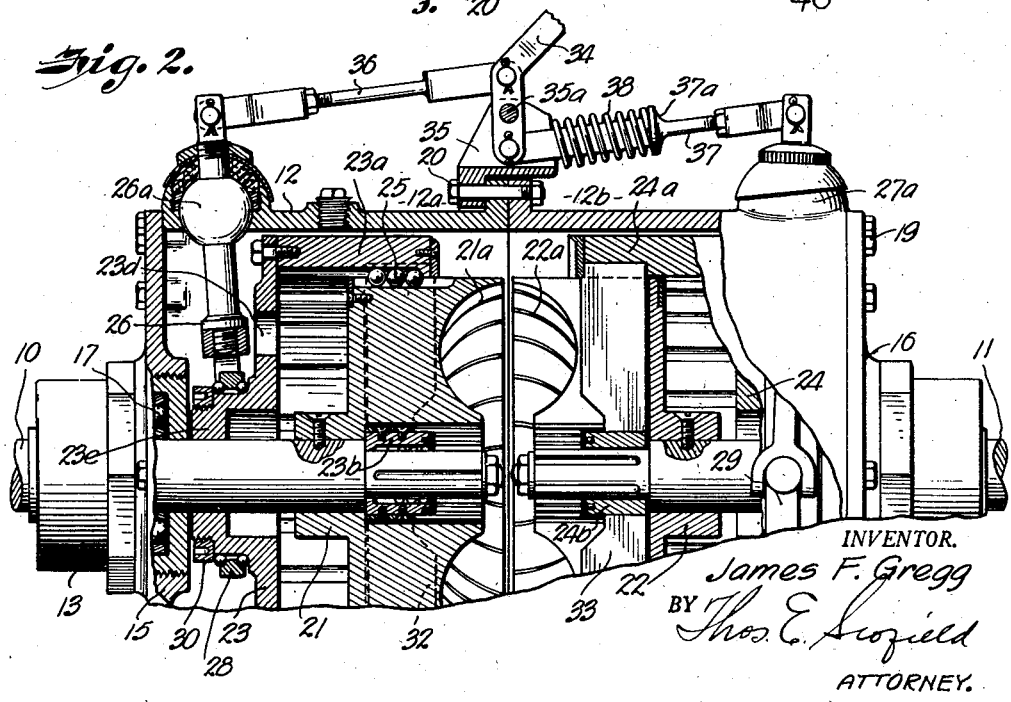
Figure 3:
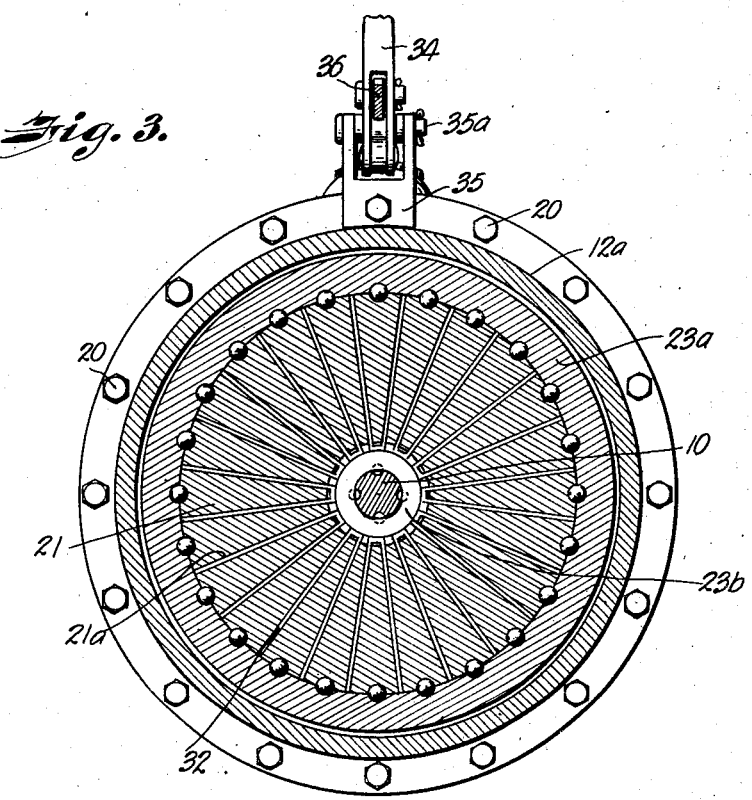
Figure 4:
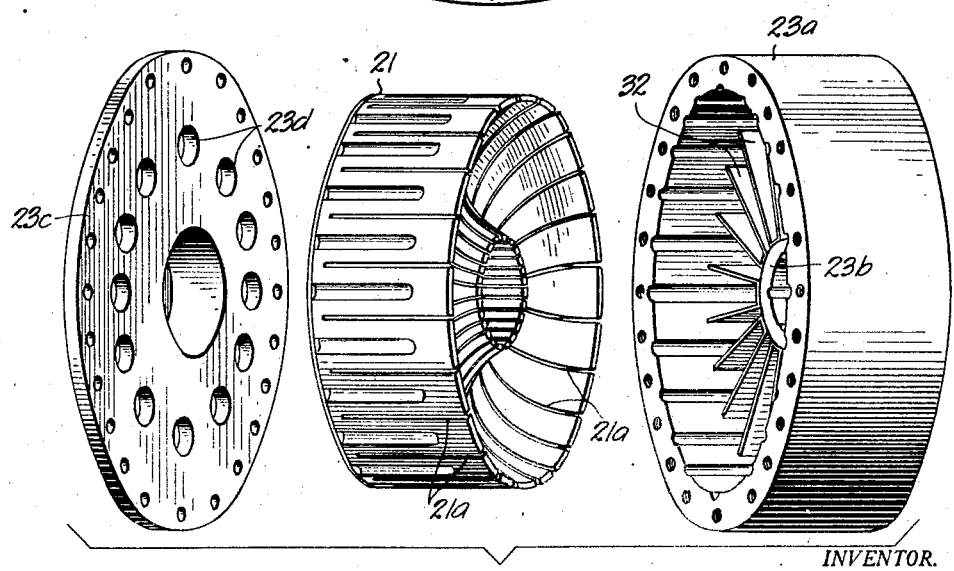

In the drawings forming a part of this specification and wherein like numerals are employed to designate like parts throughout the same:

Fig. 1 is a longitudinal sectional view of a hydraulic coupling embodying my invention and showing both the impeller and runner vanes in the advanced or operative position, Fig. 2 is a fragmentary view similar to Fig. 1 but showing the impeller and runner vanes in a retracted or neutral position, Fig. 3 is a vertical sectional view taken on the line 3—3 of Fig. 1, and Fig. 4 is an exploded perspective view of either the impeller or runner, the same being identical in their construction.

In the drawings wherein for the purpose of illustration is shown a preferred embodiment of my invention, the numerals 10 and 11 designate drive and driven shafts respectively. The shafts 10 and 11 extend coaxially into a fluid-tight cylindrical housing 12 through stuffing boxes 13 and 14 threaded into ends 15 and 16 of the housing. Ball bearings 17 and 18 within stuffing boxes 13 and 14 support shafts 10 and 11 for substantially frictionless rotation. In order that easy access may be had to the interior of the housing the ends 15 and 16 are made removable by bolts 19. The housing itself is made in two parts 12a and 12b. Radial flanges on parts 12a and 12b are clamped together by bolts 20.

An impeller comprising a neutralizing disk 21 is fixedly mounted on shaft 10. The disk telescopes a vaned impeller wheel 23 upon axial movement of the latter. A runner positioned opposite the impeller in the housing comprises a neutralizing disk 22 and a telescoping vaned runner wheel 24 mounted on driven shaft 11. The neutralizing impeller disk 21 is secured near the inner end of drive shaft 10 and the neutralizing disk 22 is secured near the inner end of driven shaft 11. Both neutralizing disks 21 and 22 fit within the open ends of the impeller and runner wheels 23 and 24 respectively. These wheels include cylindrical rims 23a and 24a which surround the neutralizing disks and move axially thereto on ball bearings 25.

Radial vanes 32 and 33 in the facing or inner portion of the rims of the impeller and runner wheels transmit power through the medium of the hydraulic fluid. The impeller and runner vanes 32 and 33 extend between the rims 23a, 24a and hubs 23b, 24b of the two wheels. The hubs are mounted on ball bearings and rotate with shafts 10 and 11. The function of the hub bearings is to maintain alignment of the impeller and runner vanes with the slots of their neutralizing disks thereby eliminating any tendency of the vanes to bind with the blanking sectors of the neutralizing disks. The impeller and runner vanes 32 and 33 fit within radial slots 21a and 22a in neutralizing disks 21 and 22. As best shown in Fig. 4, the confronting faces of the neutralizing disks 21 and 22 have a concave contour or profile to provide the coactive surfaces necessary to produce the fluid circulation which transmits power between the impeller and the runner.

Slots 21a and 22a are of substantially greater depth than the width of vanes 32 and 33 to accommodate the vanes in either an advanced or retracted position. In other words, a portion of the vanes is at all times within the slots of the neutralizing disks. Also it will be noted that the slots are cut only partially through the disks substantially preventing the movement of the fluid through the disks and providing solid outer driving portions fixedly mounted on the driving and driven shafts. If impeller and runner wheels 23 and 24 are moved toward each other as shown in Fig. 1, vanes 32 and 33 are exposed before the concave surfaces of neutralizing disks 21 and 22 providing effective power transmitting surfaces. When the impeller is rotated by drive shaft 10, the vanes 32 cause the hydraulic fluid between the impeller and runner to rotate. The rotating vortex of liquid causes the runner to rotate in a sympathetic manner.

If the rims 23a and 24a of the impeller and runner are retracted on their neutralizing disks 21 and 22 to the position shown in Fig. 2, vanes 32 and 33 will be withdrawn into slots 21a and 22a to a position behind the concave surfaces of the neutralizing disks. The sectors between the slots of the neutralizing disks then fill the spaces between the vanes. When the vanes are in the retracted position, the impeller is rendered ineffectual to rotate the runner since the segments between the slots have little or no effect on the hydraulic fluid. It is only when the vanes are in an advanced position that the hydraulic fluid between the impeller and runner has sufficient kinetic energy to cause the runner to rotate synchronously with the impeller. As the vanes are progressively advanced toward each other, the fluid therebetween acquires rotative energy which is transmitted from the impeller to the runner. At first, the slippage between the impeller and runner will be great but as the vanes 32 and 33 advance, this slippage is reduced and the load is applied gradually to the runner with little or no loss of power.

The impeller and runner wheels also have end enclosure plates 23c and 24c with openings 23d and 24d through which hydraulic fluid passes when the wheels are moved or shifted along shafts 10 and 11 thus eliminating pressure or vacuum conditions arising within the wheels. The end plates 23c and 24c have hubs 23e and 24e surrounding shafts 10 and 11. Levers 26 and 27 are journaled in the wall of housing 12 at ball and socket joints 26a and 27a. The forked inner ends of levers 26 and 27 span studs on collars 28 and 29 mounted for free rotative movement on hubs 23e and 24e. The collars 28 and 29 are held on the hubs 23d and 24d by locking rings 30 and 31. An operating lever 34 is mounted for movement about a pivot pin 35a. Pivot pin 35a is carried by a bracket 35 secured to housing 12 by one of the bolts 20. Longitudinally adjustable connecting links 36 and 37 each has one end pivoted to operating lever 34. The opposite ends of links 36 and 37 are pivoted to levers 26 and 27. A coil spring 38 confined between bracket 35 and shoulder 37a of link 37 yieldably urges the link outwardly to move the impeller and runner casings 23 and 24 toward each other.

In operation, drive shaft 10 is connected to a suitable source of power such as an internal combustion engine or other prime mover. To the housing 12 is supplied hydraulic fluid. If operating handle 34 is in the position shown in Fig. 2, levers 26 and 27 will hold vanes 32 and 33 in a retracted position between the blanking sectors of neutralizing disks 21 and 22. Since the rims of impeller and runner wheels 23 and 24 are engaged and slidably associated through ball bearings 25 with the neutralizing disks 21 and 22, the wheels and neutralizing disks will rotate together. The bearings 25 permit the impeller and runner wheels to be easily shifted axially of the neutralizing disks regardless of the energy or power being transmitted. With both the impeller and runner vanes in the retracted position, no effective energy is given to the hydraulic liquid and no rotative movement is transmitted to the runner.

However, if operating handle 34 is moved to the position shown in Fig. 1, the impeller and runner vanes will be advanced into an exposed position before the concave surfaces of the neutralizing disks 21 and 22. As the vanes advance and are exposed to the action of the fluid, the hydraulic fluid begins to rotate and to circulate in a spiral path between the impeller and runner. At first the movement of the runner will be slight and there will be considerable slippage between the impeller and runner. However, as the vanes advance, the slippage becomes less and the power transmission more efficient. As the speed of the whirling vortex of fluid increases it will impart an increasing amount of energy to the vanes of the runner and as the vanes of the runner become more exposed, the effective area which they offer to the hydraulic fluid is increased. By the time impeller and runner vanes 32 and 33 have reached a fully advanced position, the runner will be rotating substantially synchronously with the impeller.

It may thus be seen that I have accomplished the objects of my invention. I have provided a clutch arrangement for a hydraulic coupling wherein the vanes of both the impeller and runner may be retracted or advanced between blanking sectors of a pair of neutralizing disks. When the vanes are in the retracted position, the impeller and runner are rendered ineffectual to either transmit or receive power. Thus there will be no creepage of the runner regardless of the speed at which the impeller is rotating. When the impeller and runner vanes are moved to the advanced position, the energy imposed on the hydraulic fluid by the impeller is gradually transmitted to the runner.

There has also been provided a power transmitting device in combination with a hydraulic clutch wherein the power of the driving member passes through the neutralizing member to the impeller thence through the hydraulic fluid to the runner, thence to its neutralizing member and finally to the driven shaft.

Although the explanation of the device includes a neutralizing or blanking disk for both the impeller and runner wheels it is contemplated that with probably less satisfaction a single blanking or neutralizing disk may be used with the runner alone. In this event the power transmission would flow from the drive shaft to the impeller, to the hydraulic fluid, to the runner and from the rim of the runner to the runner neutralizing disk, thence to the driven shaft.

The mountings for the housing 12 have been eliminated from the drawings in the interest of simplifying the showing as has provision for cooling the hydraulic fluid in the event of overheating. Filler plug 39 and drain plug 40 may be removed to charge the housing 12 with the hydraulic fluid or to drain the fluid therefrom.

It is to be understood that the form of my invention herewith shown and described is to be taken as a preferred example of the same and that various changes in the size, shape and arrangements of parts may be resorted to without departing from the spirit of my invention or the scope of the appended claims. Also, the invention is applicable to any service where power is to be transmitted from a drive to a driven shaft.

Having thus described my invention, I claim:

1. A hydraulic coupling comprising a fluid-tight housing, a hydraulic fluid within the housing, a drive shaft extending through one end of the housing, a driven shaft extending through the other end of the housing, an impeller mounted on the drive shaft, a runner mounted on the driven shaft, said impeller and said runner each including a neutralizing disk secured to the shaft having radial slots in one face thereof, said slots defining sectors and the faces of the sectors having a concave profile, a wheel including a rim surrounding and axially slidable on the neutralizing disk, a hub slidable on the shaft and radial vanes connecting the hub and rim adapted to slide in the slots of the neutralizing disk, ball bearings between the rim and neutralizing disk facilitating axial movement therebetween and preventing relative rotative movement, ball bearings between the hub and shaft facilitating axial movement therebetween and preventing relative rotative movement, said bearings holding the vanes in alignment with the slots in the neutralizing disk and transmitting power from the vanes to the driven shaft through the rim and neutralizing disk, and means for moving the wheels axially on said neutralizing disks.

2. A hydraulic coupling comprising a fluid-tight housing, a hydraulic fluid within the housing, a drive shaft extending through one end of the housing, a driven shaft extending through the other end of the housing, an impeller mounted on the drive shaft, a runner mounted on the driven shaft, said impeller and said runner each including a neutralizing disk secured to the shaft having radial slots in one face thereof, said slots defining sectors and the faces of the sectors having a concave profile, a wheel including a rim surrounding and axially slidable on the neutralizing disk, a hub slidable on the shaft and radial vanes connecting the hub and rim adapted to slide in the slots of the neutralizing disk, means for preventing relative rotation betwen the rim and the neutralizing disk and between the hub and the shaft, said means holding the vanes in alignment with the slots in the neutralizing disk and transmitting power from the vanes to the driven shaft through the rim and neutralizing disk, and means for moving the wheels axially on said neutralizing disks.

3. A hydraulic coupling comprising a fluid-tight housing, a hydraulic fluid within the housing, a drive shaft extending through one end of the housing, a driven shaft extending through the other end of the housing, an impeller mounted on the drive shaft, a runner mounted on the driven shaft, said impeller and said runner each including a neutralizing disk secured to the shaft having radial slots in one face thereof, said slots defining sectors and the faces of the sectors having a concave profile, a wheel including a rim slidably but nonrotatably mounted on the neutralizing disc, a hub slidably but nonrotatably mounted on the shaft and radial vanes connected to the hub and rim adapted to slide in the slots of the neutralizing disk, said rim and hub holding the vanes in alignment with the slots in the neutralizing disk and transmitting power from the vanes to the driven shaft through the rim and neutralizing disk, and means for moving the wheels axially on said neutralizing disks.

4. A hydraulic coupling comprising a fluid-tight housing, a hydraulic fluid within the housing, a drive shaft extending through one end of the housing, a driven shaft extending through the other end of the housing, an impeller mounted on the drive shaft, a runner mounted on the driven shaft, said runner including a neutralizing disk secured to the shaft and having radial slots in one face thereof, said slots defining sectors and the faces of the sectors having a concave profile, a wheel including a rim slidably but nonrotatably mounted on the neutralizing disk, registering axial grooves in the periphery of the neutralizing disk and wheel rim, balls in said grooves, a hub slidably but nonrotatably mounted on the shaft and radial vanes connected to the hub and rim adapted to slide in the slots of the neutralizing disk, said rim and hub holding the vanes in alignment with the slots in the neutralizing disk and transmitting power from the vanes to the driven shaft through the rim and neutralizing disk, and means for moving the wheel axially on said neutralizing disk.

JAMES F. GREGG.